United States Patent [19]

Theodore

[11] 4,297,113
[45] Oct. 27, 1981

[54] GAS FILTRATION APPARATUS

[76] Inventor: Louis Theodore, 51 Maple Dr., New Hyde Park, N.Y. 11040

[21] Appl. No.: 126,553

[22] Filed: Mar. 3, 1980

[51] Int. Cl.³ .............................................. B01D 46/00
[52] U.S. Cl. ......................................... 55/213; 55/97; 55/341 R
[58] Field of Search ....................... 55/96, 97, 212, 213, 55/283, 270, 302, 304, 305, 341 R, 417, 420; 73/38, 118; 251/65; 137/458, 459, 460, 527.6

[56] References Cited

U.S. PATENT DOCUMENTS

| | | | |
|---|---|---|---|
| 566,554 | 8/1896 | Young et al. | 251/458 |
| 1,111,578 | 9/1914 | Hawkins | 137/527.6 |
| 1,349,480 | 8/1920 | Wilsmore | 55/286 |
| 2,340,936 | 2/1944 | Cook | 137/459 |
| 2,694,408 | 11/1954 | McRae | 137/460 |
| 2,805,732 | 9/1957 | Martinez | 55/304 |
| 2,880,819 | 4/1959 | King et al. | 55/213 |
| 2,892,512 | 6/1959 | Watts et al. | 55/213 |
| 3,577,705 | 5/1971 | Sharlit | 55/283 |
| 3,665,958 | 5/1972 | Dunkelis | 251/65 |
| 3,865,561 | 2/1975 | Osborn | 55/270 |
| 3,891,000 | 6/1975 | Melnick | 251/65 |

FOREIGN PATENT DOCUMENTS

| | | | |
|---|---|---|---|
| 1040113 | 10/1978 | Canada | 55/302 |
| 637129 | 12/1978 | U.S.S.R. | 55/213 |
| 647004 | 2/1979 | U.S.S.R. | 55/302 |

Primary Examiner—Bernard Nozick
Attorney, Agent, or Firm—Neophytos Ganiaris

[57] ABSTRACT

An apparatus wherein dust-laden gas is pumped into a housing having a plurality of tubular fabric filter bags. The gas flows through the bags to the interior of each tubular filter element and the solid particulates are deposited on the exterior surface of the fabric element. The clean gas from the interior of each filter element passes to the clean gas plenum via a thimble opening. Whenever one of the bags is ruptured, the gas velocity at the thimble opening increases dramatically due to the elimination of the resistance to gas flow by the fabric. A valve actuated by the sudden increase in gas velocity closes the thimble opening automatically and, thus, the contamination of the clean gas stream with solid particulates is prevented. The entire filtration apparatus is shut-down automatically by pressure control whenever, 25% or more of the fabric filter bags are ruptured and their thimble openings are closed by the respective valves.

5 Claims, 2 Drawing Figures

GAS FILTRATION APPARATUS

BACKGROUND OF THE INVENTION

This invention relates to a mesh, e.g. fabric filtration process for removing solid particulate contaminants from a gas stream.

THE PRIOR ART

One of the oldest, simplest and most efficient methods for removing solid particulate contaminants from gas streams is by filtration through fabric media. The fabric filter is capable of providing high collection efficiencies for particles as small as 0.5 microns and will remove a substantial quantity of those particles as small as 0.01 micron. This inherently high efficiency makes baghouse filtration one of the more attractive air pollution control devices.

The basic baghouse filtration system consists of a housing having a plurality of fabric tubular filters or bags suspended in its interior. The dust-laden gas stream is introduced either inside or outside the bags and the dust collects on the fabric filter media. The bag life and maintenance are of critical importance in determining the economic feasibility of baghouse systems versus other devices for removing solid contaminants from gas streams (i.e. electrostatic precipitators.).

Bag failure is one of the most serious problems encountered in baghouse filtration systems. With usage, the fabric material deteriorates from a variety of causes; thermal erosion, mechanical stress through repeated flexing, chemical attack, abrasion, etc. Bag failure during operation results in a sudden increase of contaminants in the outlet stream, often in excess of legal and/or acceptable limits. The replacement of single bags is not practical. The operating personnel, usually, wait until several bags have failed and the contaminants content in the outlet stream has increased above acceptable limits; then, the entire baghouse system is shut down and the defective bags are replaced.

OBJECTS OF THE INVENTION

It is the primary object of the present invention to provide a new filtration process which automatically closes the opening of any filter element that has failed and, thus, prevents any contamination of the effluent clean gas stream.

Another object of this invention is to provide a new closure device for closing automatically the opening of the filter element that has failed; the closure is activated by the sudden change in velocity of the clean gas flowing through the opening.

A further object of this invention is to provide a new filtration process which is devised so as to be discontinued automatically by pressure control whenever at least a proportion, say 20–25%, of the individual filter elements have ruptured; thus eliminating the human error of visual observations for the contaminants content in the effluent gas stream and/or the cumbersome analytical procedures for estimating the level of solid contaminants in the effluent gas stream.

SUMMARY OF THE INVENTION

According to a first aspect of the invention a process for removing solid particulate material from a gas stream comprises the steps of passing a particle-laden gas stream into a housing having at least one hollow mesh filter element, passing said gas through the mesh to the interior of the at least one filter element, whereby the solid particulate material is deposited over the exterior surface of said filter element, removing clean gas from the interior of the filter element through an outlet opening, and, whenever the filter element is ruptured such that the gas velocity at the outlet opening increases by a predetermined factor, causing said increase of gas velocity to result in closing of said opening.

According to a second aspect of the invention, apparatus for removing particulate material from a gas stream comprises a housing having inlet means and outlet means, at least one gas-permeable hollow mesh filter element supported in said housing and serving to partition the interior of the housing into a first chamber communicating with the inlet means and a second chamber communicating with the outlet means, the interior of the at least one filter element communicating by an opening with said second chamber, a closure for said filter opening, and releasable latching means for holding said closure in a first open position, said latching means being responsive to movement of the closure into a second further open position to release said closure for passage to closed position.

According to a third aspect of the invention, a device for causing automatic closing, as a result of abrupt increase of gas velocity therethrough, of an opening of a hollow fabric filter element, comprises thimble means having said fabric secured thereto and defining said opening, a plate-like closure hinged on said thimble means and movable about said hinge into first and second open positions, and into closed position, a flexible ligature having a first end and a second end, the first end being secured to said closure and the second end being formed as a loop, structure supporting said thimble means and including an inverted hook positioned relative to the thimble means such that when said loop is engaged on said hook the closure is held against gravity in the first open position, whereby upon movement of said closure, as a result of increase of gas velocity through the opening, upwardly towards said second open position, said loop is permitted to fall from engagement with said hook and permit the closure to pass to closed position.

These and other features, objects and advantages of the invention will be apparent during the course of the following description taken in conjunction with the accompanying drawings.

DESCRIPTION OF THE PREFERRED EMBODIMENTS

Figure 1:
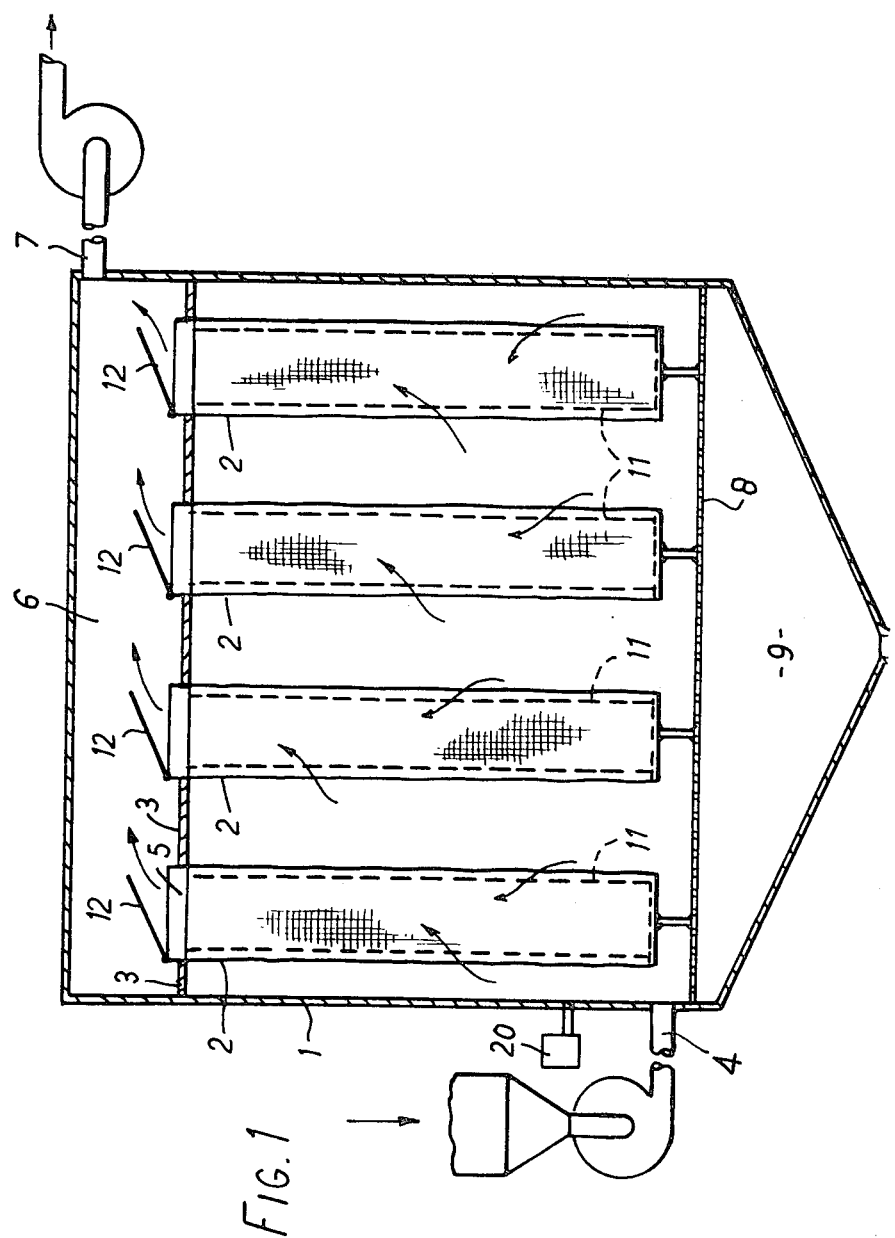
FIG. 1 is a vertical section of the interior of the filtration system showing fabric filter elements within a housing, a clean gas plenum, a hopper for collecting solids, a closure for closing a thimble of each filter element, an inlet and an outlet for a gas stream, and an outlet for solids removal.

As shown in FIG. 1 a fabric-gas filtration system consists of a housing 1 with a plurality of fabric filter elements or bags 2 suspended in the interior of the housing from an impermeable wall 3. The dust-laden gas stream is introduced into the housing through an opening 4, passes through the fabric filter medium of the bag 2 and clean gas flows from the interior of the bag through the thimble opening 5 into the clean gas plenum chamber 6 of the housing; finally, the clean gas is exhausted from the system through opening 7 at the top of the housing.

The dust or solid particulates entering the housing 1 are deposited on the fabric filter media of the bag 2 and periodically are removed by various techniques (i.e. flexing of the fabric filter media or using a reverse clean gas flow in the direction from opening 7 back to inlet 4) and passes through apertured wall 8 to be collected into the hopper 9 of the housing 1. The discharge of the solids from the hopper 9 is accomplished by standard valves 10 either continuously or intermittently.

The dust-laden gas stream can be either "pushed" or "pulled" through the baghouse filtration system. In the pressure system, a compressor or blower (not shown) pumps the gas into the housing 1 through the inlet 4, or for a suction system (pull through); the exhauster (not shown) is located downstream of the baghouse and pulls the gas through outlet 7.

The fabric filter elements or bags 2 have a rigid apertured support or cage 11 in the interior in order to prevent the collapse of the bag 2 due to the higher pressure on the outside of the fabric filter element 2; the gas flows from the exterior to the interior of the bag 2.

Under normal operating conditions, in a practical embodiment by way of example, the gas flow through the fabric filter media 2 is in the range of 2-6 ft/min. and the velocity of gas through the thimble opening 5 is approximately 200-600 ft/min. Whenever the bag has a failure, and this can mean anything from a pinhole opening in the fabric filter media to the case when it is so completely torn as to offer negligible resistance to gas flow, the velocity of the gas through the thimble opening 5 is increased dramatically. For complete bag rupture, the velocity of the gas through the thimble opening 5 is further increased by at least a factor of ten.

Figure 2:
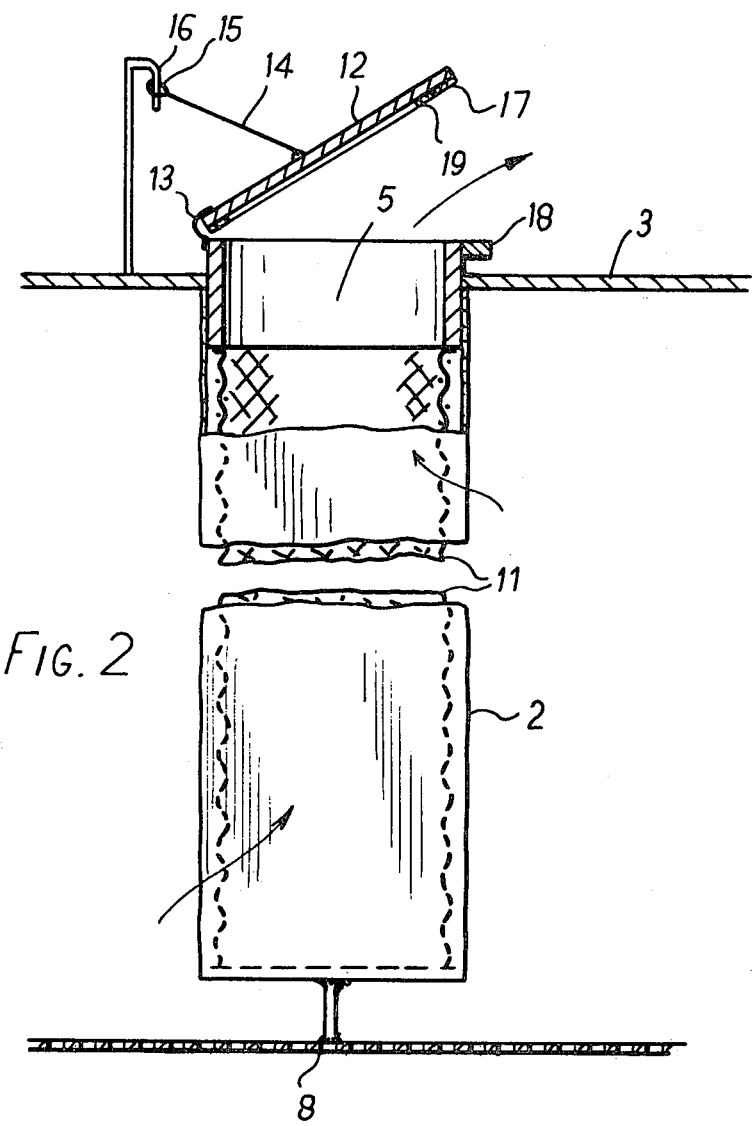
FIG. 2 is a vertical section of a single fabric filter element or bag with its closure for closing the thimble.

The sudden increase in gas velocity at the thimble opening 5 as a result of the failure of the fabric filter element 2 causes a closure 12 to close the opening 5. As shown in more detail in FIG. 2, the closure 12 is secured on the edge of the thimble opening 5 with a hinge 13 and held in open position at an angle of 45-60 degrees from the vertical axis by a cord 14. The cord 14 has one end secured on the closure and the other end forms a loop 15 which is engaged about an inverted hook 16.

The closure 12 is a plate, made of metal or other material, of sufficient size to cover the entire open area of the thimble opening 5. Also, the weight of the closure 12 is such that, under normal operating conditions, the gas impingement on the underface of the closure does not cause the closure to rise. However, if the gas velocity is suddenly increased by a factor of at least two, the additional force exerted upwardly on the closure due to gas impingement causes the closure 12 to move momentarily upwards by a few degrees (2-5). As the closure 12 moves upwards, the cord 14, which is normally under tension, becomes slack and the loop 15 falls off the hook 16; the closure 12 then falls downwards due to its own weight and closes the thimble opening 5.

The closure 12 is locked in closed position by two magnets. One magnet 17 is fixed on the closure 12 and the other magnet 18 is secured at the edge of the thimble opening 5. The magnets are positioned in such a way that the north-pole of one faces the south-pole of the other, as the closure 12 moves downwards; the magnetic attraction of the opposite poles locks the plug in closed position automatically. A clamp or other mechanical or electrical device could also be used for locking the closure 12 automatically.

The locking of the closure 12 is necessary in order to prevent it from opening due to the pressure increase in the housing 1 as more and more bags are ruptured.

The closure 12 is also equipped with a gasket 19 or other sealing device which prevents any gas leakage due to the pressure increase after the closure 12 has been locked in closed position.

The failure of an individual fabric filter element and subsequent closing of its thimble opening, causes an increase in gas velocity through the remaining fabric filter media, because for a given inflow rate there are fewer bags permitting passage of gas to the outlet. Also, the pressure in the housing 1 increases due to the proportionately higher pressure drop across the filter media. For example, in a baghouse system having 1,000 bags or fabric filter elements, the failure of 250 of the bags and subsequent closing of their thimble openings 5 will result in approximately 25% increase in pressure drop, since the some total gas flow must be filtered by only 750 bags. The process system can thus be shut down for bag replacement by a pressure controller 20 sensing the pressure increase in the housing 1 and switching off power to the compressor or exhauster pumping the gas. Thus, the operating personnel do not need to rely on visual observation (i.e. smoking stack) or cumbersome analytical procedures for estimating the level of contaminants in the effluent gas stream and, in turn, the number of ruptured bags. The system is shut down automatically whenever the pressure in the housing 1 increases by 25% or whatever other set point may be determined as adequate and economical for a specific application.

While this invention has been shown and described in the best forms known, it will nevertheless be understood that this is purely exemplary and that modifications may be made without departing from the scope of the invention as defined in the appended claims.

I claim:

1. Apparatus, for removing particulate material from a gas stream, comprising a housing having inlet means and outlet means, a plurality of gas-permeable hollow mesh filter bags supported in said housing and serving to partition the interior of the housing into a first chamber communicating with the inlet means and a second chamber communicating with the outlet means, the interior of all of said filter bags communicating through means defining respective openings with said second chamber, a respective closure for the opening of each filter bag, said closure being a plate hingedly mounted to means defining said opening and responsive to a predetermined increase of gas velocity through the opening, as a result of rupture of the filter bag, to close the opening, a cord attached between the plate and retaining means mounted adjacent to the plate, said retaining means releasably retaining the cord responsive to gas flow and non-rupture of the bag, means on said cord for receiving the retaining means and for releasing the cord upon rupture of the bag, and pressure-sensing means communicating with said first housing chamber and arranged, upon sensing of a predetermined change of pressure in said first chamber as a result of closing of a predetermined proportion of said openings to terminate entry of said gas stream into said housing through said inlet means.

2. Apparatus, as claimed in claim 1, wherein said closure is associated with a respective releasable latching means for holding said closure in a first open position, said latching means being responsive to movement of the closure, into a second further open position, to release the closure for passage to closed position.

3. Apparatus, as claimed in claim 2, wherein the closure is movable under gravity to closed position.

4. Apparatus, as claimed in claim 2, comprising other latching means for latching the closure releasably in closed position.

5. Apparatus, as claimed in claim 4, wherein said other latching means are magnetic.

* * * * *